United States Patent Office 2,939,818
Patented June 7, 1960

2,939,818

AQUEOUS THERAPEUTIC COMPOSITIONS

Melvin L. Berger, Flushing, N.Y., assignor to Chas. Pfizer & Co., Inc., New York, N.Y., a corporation of Delaware No Drawing. Filed Apr. 9, 1957, Ser. No. 651,578

5 Claims. (Cl. 167—65)

This invention relates to new aqueous therapeutic compositions. More particularly, the present invention relates to an aqueous suspension of a water-insoluble salt of penicillin which possesses improved syringeability and stability properties.

A variety of preparations have been described which include a water-insoluble salt of penicillin as the principal active constituent. Many of these have proved to be effective in the therapy of a variety of infectious diseases. Certain of these compositions consist of an aqueous suspension of the antibiotic for intramuscular injection.

It has been found that when particularly finely divided particles of a water-insoluble penecillin salt, i.e., particles having an average diameter of less than 10 to 20 microns are placed in aqueous suspension, there is a definite tendency for the smaller particles to adhere to the walls of the glass containers in which they are commonly stored. This is true even though the walls of such containers are treated with materials such as silicones which tend to make the containers clear draining.

These aqueous compositions also possess other disadvantages. There is a tendency towards the formation of non-uniform portions of the suspension resulting in lack of dosage uniformity upon administering partial volumes of the contents of the container. Furthermore, many such compositions display undesirably high viscosities which make it difficult to administer a definite amount of the preparation to a patient. In addition, many aqueous suspensions of these penicillin salts have, in the past, tended to agglomerate which cause plugging of hypodermic needles and binding within the hypodermic syringe when attempts were made to use the suspension. A still further problem is encountered with sedimentation, many suspensions tending to settle out upon standing to form a sludge which is difficult or impossible to re-suspend. In extreme cases, drying up or complete caking of the suspension occurs on storage.

In accordance with the present invention, it has been discovered that such difficulties may be obviated by the inclusion of a minor proportion by weight of a parenterally acceptable water-soluble choline derivative or choline itself. Among the parenterally acceptable water-soluble choline derivatives are included choline chloride, choline dihydrogen citrate, choline dihydrogen tartrate and choline chloride carbamate. A particularly valuable property imparted to aqueous suspensions by choline and the aforesaid derivatives is enhanced syringeability. Thus, although the aqueous suspensions of the present invention, when stored in conventional containers, are viscous or in a jellified state, application of pressure, such as that applied by the plunger of a syringe when discharging or filling the syringe causes the suspension to become extremely fluid and flow easily through the usual hypodermic needle without plugging the same. Thus, under stress, the aqueous suspensions of the present invention display properties which properly classify them as being of the non-Newtonian type. In addition to the referred to enhanced syringeability, the compositions of the present invention are also of improved storage life in that normal conditions of storage do not result in drying out and caking.

In the preparation of the compositions of this invention, a variety of water-insoluble salts of penicillin are found to be most satisfactory. Thus, procaine penicillin, dibenzylethylene-diamine penicillin (DBED penicillin), N - benzyl - N' - (3 - ethoxy - 4 - hydroxy) - benzyl - ethylenediamine penicillin, 2-chloroprocaine penicillin, N,N'-di-(4-methoxybenzyl)-ethylenediamine penicillin, etc. are set forth as examples. In general, such water-insoluble salts are employed in an amount sufficient to furnish from about 300,000 to 750,000 units of penicillin per cc. of final suspension. A finely divided water-insoluble penicillin salt, e.g., salts consisting essentially of particles ranging from about 5 to 30 microns in size, with preferably none in excess of 100 microns, are, as is known in the art, conventionally employed in aqueous compositions of the type contemplated by the present invention.

In addition to the choline or choline derivative additive, the compositions of the present invention may also contain urea and other related compounds including urea derivatives for the purpose of further improving the same. Thus, it has been found that these further additives assist choline and its derivatives in imparting improved syringeability and storage properties. The assisting action of these further additives appears to involve a synergistic effect in that although choline and its derivatives produce effects which are far superior to those obtainable through the use of urea, its derivatives and other related compounds, the effect when employing both is in excess of that obtained when employing either alone in the same percentage by weight. This synergistic effect is especially pronounced in the case of dibenzylethylene diamine penicillin suspensions.

Based on the weight of the water-insoluble salt present in the suspension, preferred amounts of choline and its derivatives used as an additive include amounts within the range of from about 0.5 to 10%, a particularly effective range being from about 1.5 to 2.5%. The amount of urea, its derivatives and related products employed and also based on the weight of the water-insoluble salt of penicillin present ranges from about 3 to 10% by weight, a preferred amount being about 4% by weight.

The derivatives and related compounds of urea referred to above which are parenterally acceptable and preferred in accordance with the present invention include compounds such as thiocarbamide, carbamyl chloride, urea nitrate, thiourethane, and lower alkyl carbamates such as urethane, methyl urethane, propyl urethane and butyl urethane.

In addition to choline and its derivatives, with or without the urea type additives referred to above, preferred compositions of the present invention include a parenterally acceptable buffer which functions, as is known, to stabilize the suspensions against pH changes and thereby prevents degradation of the penicillin salt. Preferred buffers include the alkali metal salts of polybasic organic acids such as sodium citrate. Other suitable buffers include sodium acetate, sodium lactate, and alkali metal salts of inorganic acids such as monobasic and dibasic sodium phosphates. As is known, a minor proportion by weight of buffering agent is required, e.g., a percent ranging from about 0.25 to 5% by weight based on the weight of water-insoluble salt of penicillin present.

The compositions of this invention also preferably include a parenterally acceptable suspending agent to maintain a uniform dispersion of the water-insoluble salt of penicillin. Suitable suspending agents include methyl cellulose ("Methocel"); alkali metal salts of carboxymethylcellulose, such as sodium carboxymethylcellulose ("CMC"); polyvinylpyrrolidone ("PVP"); lecithin; carboxypolymethylene polymers ("Carbopol"); as well as the natural gums, such as the alginates, gelatin, pectin, starch, and the like. The cellulose derivatives are preferred for most purposes. The suspending agent is advantageously employed in an amount ranging from about 1 to 5% by weight of the water-insoluble salt of penicillin.

In addition to the above additives in accordance with the present invention, other additives such as antioxidants and preservatives, such as the types well known in the art, may be included in the usual percent by weight proportions. As examples of preservatives are included "Parabens," i.e., lower alkyl esters of parahydroxybenzoic acid such as the methyl, propyl, or butyl esters; sodium bisulfite; quaternary ammonium compounds, such as benzalkonium chloride; etc.

The compositions of this invention are particularly effective in giving prolonged therapeutic blood levels upon intramuscular administration. If desired, other antibiotics commonly used in conjunction with penicillin such as streptomycin and dihydrostreptomycin, may also be included. Thus, for example, a water-soluble salt of pencillin, in addition to the water-insoluble salts, assists in obtaining a rapid rise in penicillin blood levels upon administration of the composition. In addition, when procaine penicillin is employed in the water-insoluble penicillin, a procaine salt, such as procaine hydrochloride, is preferably employed to act as a solubility depressant for the procaine penicillin and thereby maintain its stability. About 2 to 5% of the procaine salt by weight of the procaine penicillin is adequate for most purposes.

Example I

An aqueous suspension was prepared using the following ingredients in the proportions by weight specified:

| | | |
|---|---|---|
| DBED penicillin | gms | 52.000 |
| Sodium citrate | gms | 0.200 |
| Sodium bisulfite | gms | 0.330 |
| Methyl paraben | gms | 0.018 |
| Propyl paraben | gms | 0.015 |
| Methocel (2% solution) | gms | 46.000 |
| Choline chloride | gms | 2.000 |
| Pyrogen free water | cc | 100.000 |

The resulting product was a smooth, homogeneous suspension which exhibited excellent syringeability through a 20 gauge needle and good syringeability through a 24 gauge needle.

Example II

Another aqueous suspension was prepared using the following ingredients in the proportions by weight specified:

| | | |
|---|---|---|
| DBED penicillin | gms | 52.000 |
| Sodium citrate | gms | 0.200 |
| Sodium bisulfite | gms | 0.330 |
| Methyl paraben | gms | .018 |
| Propyl paraben | gms | .015 |
| Methocel (2% solution) | gms | 44.000 |
| Urea | gms | 4.000 |
| Pyrogen free water | cc | 100.000 |

The resulting suspension exhibited only fair syringeability through a 20 gauge needle and poor syringeability through a 24 gauge needle.

Example III

Another aqueous suspension was prepared using the following ingredients in the proportions by weight specified:

| | | |
|---|---|---|
| DBED penicillin | gms | 52.000 |
| Sodium citrate | gms | 0.200 |
| Sodium bisulfite | gms | 0.330 |
| Methyl paraben | gms | .018 |
| Propyl paraben | gms | .015 |
| Methocel (2% solution) | gms | 45.000 |
| Choline chloride | gms | 1.000 |
| Urea | gms | 2.000 |
| Pyrogen free water | cc | 100.000 |

The resulting product was a smooth, homogeneous suspension which exhibited excellent syringeability through both 20 gauge and 24 gauge needles. The combination of choline chloride and urea was therefore found to exhibit greater fluidity or better syringeability than was obtained with either ingredient separately employed in accordance with the preceding examples.

Example IV

A particularly useful suspension was prepared using the following ingredients in proportions by weights specified:

| | | |
|---|---|---|
| DBED penicillin | gms | 51.427 |
| Sodium citrate | gms | .191 |
| Sodium bisulfite | gms | .314 |
| Methyl paraben | gms | .025 |
| Propyl paraben | gms | .019 |
| Urea | gms | 1.905 |
| Choline chloride | gms | .952 |
| Methocel | gms | .571 |
| Pyrogen free water | cc | 100.000 |

This product also was a smooth, homogeneous mixture which exhibited excellent syringeability through both 20 gauge and 24 gauge needles. Its stability and syringeability remained excellent in aging tests for nine weeks at 45° C.

Example V

Another suspension was prepared using the following ingredients in the proportions by weight specified:

| | | |
|---|---|---|
| Procaine penicillin | gms | 52.000 |
| Sodium citrate | gms | .200 |
| Sodium bisulfite | gms | .330 |
| Methyl paraben | gms | .018 |
| Propyl paraben | gms | .015 |
| Methocel (2% solution) | gms | 46.000 |
| Urethane | gms | 2.000 |
| Choline chloride | gms | 1.000 |
| Pyrogen free water | cc | 100.000 |

Example VI

Still another suspension was prepared using the following ingredients in the proportions by weight specified:

| | | |
|---|---|---|
| DBED penicillin | gms | 52.000 |
| Sodium citrate | gms | .200 |
| Sodium bisulfite | gms | .330 |
| Methyl paraben | gms | .018 |
| Propyl paraben | gms | .015 |
| Methocel (2% solution) | gms | 46.000 |
| Carbamyl chloride | gms | 2.000 |
| Choline dihydrogen citrate | gms | 1.000 |
| Pyrogen free water | cc | 100.000 |

This product was also excellent as in the case of those previously described.

Example VII

A further aqueous suspension was prepared using the following ingredients in the proportions by weight specified:

| | | |
|---|---|---|
| DBED penicillin | gms | 52.000 |
| Sodium citrate | gms | .200 |
| Sodium bisulfite | gms | .330 |
| Methocel (2% solution) | gms | 46.000 |
| Methyl paraben | gms | .018 |
| Propyl paraben | gms | .015 |
| Thiocarbamide | gms | 2.000 |
| Choline | gms | 1.000 |
| Pyrogen free water | cc | 100.000 |

This product exhibited the advantageous properties referred to above.

Example VIII

Another suspension was prepared using the following ingredients in the proportions by weight specified:

| | | |
|---|---|---|
| Procaine penicillin | gms | 52.000 |
| Sodium citrate | gms | .200 |
| Sodium bisulfite | gms | .330 |
| Methocel (2% solution) | gms | 46.000 |
| Methyl paraben | gms | .018 |
| Propyl paraben | gms | .015 |
| Urea nitrate | gms | 2.000 |
| Choline chloride carbamate | gms | 1.000 |
| Pyrogen free water | cc | 100.000 |

Example IX

A still further aqueous suspension was prepared using the following ingredients in the proportions by weight specified:

| | | |
|---|---|---|
| Procaine penicillin | gms | 52.000 |
| Sodium citrate | gms | .200 |
| Sodium bisulfite | gms | .330 |
| Methocel (2% solution) | gms | 46.000 |
| Methyl paraben | gms | .018 |
| Propyl paraben | gms | .015 |
| Thiourethane | gms | 2.000 |
| Choline dihydrogen tartrate | gms | 1.000 |
| Pyrogen free water | cc | 100.000 |

This suspension likewise exhibited excellent stability and syringeability.

What is claimed is:

1. A therapeutic composition comprising an aqueous suspension of a water-insoluble salt of penicillin in finely divided form and a minor proportion by weight of a compound selected from the group consisting of choline, choline chloride, choline dihydrogen citrate, choline dihydrogen tartrate and choline chloride carbamate, the amount of said compound based on the weight of the water-insoluble salt of penicillin being within the range from about 0.5 to about 10%.

2. A therapeutic composition as set forth in claim 1 including a minor proportion by weight of a second compound selected from the group consisting of urea, thiocarbamide, carbamyl chloride, urea nitrate, thiourethane, and lower alkyl carbamates, the amount of said second compound based on the weight of the water-insoluble salt of penicillin being within the range from about 3 to about 10%.

3. A therapeutic composition as set forth in claim 1 including from about 1 to 5% by weight of a parenterally acceptable suspending agent.

4. A therapeutic composition comprising an aqueous suspension of dibenzylethylenediamine penicillin in finely divided form, from about 0.5 to 10% of choline chloride, from about 3 to 10% of urea and from about 1 to 5% of a parenterally acceptable suspending agent, the percentages being based on the weight of the dibenzylethylenediamine penicillin.

5. A therapeutic composition as set forth in claim 4 including a minor proportion by weight of a parenterally acceptable water-soluble buffer and preservative.

References Cited in the file of this patent
UNITED STATES PATENTS 2,749,274    Buckwalter _____ June 5, 1956

OTHER REFERENCES

Goodman and Gilman: "The Pharmacological Basis of Therapentics," 2nd ed., The Macmillan Co., 1955, p. 1710.